US008295264B2

(12) United States Patent
Wang et al.

(10) Patent No.: US 8,295,264 B2
(45) Date of Patent: Oct. 23, 2012

(54) MBMS SOFT COMBINING

(75) Inventors: Xinhua Wang, Glen Waverley (AU);
Thanh Ngoc Bui, Wheelers Hill (AU);
Dobrica Vasic, Vermont South (AU)

(73) Assignee: NEC Corporation, Tokyo (JP)

( * ) Notice: Subject to any disclaimer, the term of this patent is extended or adjusted under 35 U.S.C. 154(b) by 798 days.

(21) Appl. No.: 11/914,910

(22) PCT Filed: Jun. 23, 2006

(86) PCT No.: PCT/JP2006/313034
§ 371 (c)(1),
(2), (4) Date: Nov. 19, 2007

(87) PCT Pub. No.: WO2006/137594
PCT Pub. Date: Dec. 28, 2006

(65) Prior Publication Data
US 2009/0061875 A1 Mar. 5, 2009

(30) Foreign Application Priority Data

Jun. 23, 2005 (AU) ................. 2005903316
May 19, 2006 (AU) ................. 2006202143

(51) Int. Cl.
*H04J 3/24* (2006.01)
*H04W 4/00* (2009.01)
(52) U.S. Cl. .................. 370/349; 370/328; 370/338
(58) Field of Classification Search .......... 708/495, 708/204, 205, 209, 501, 502; 370/310, 312, 370/313, 319, 320, 321, 328, 330, 335, 343, 370/336, 338, 349, 352, 329, 331, 342, 428, 370/431; 455/407, 438, 442, 450, 522, 561
See application file for complete search history.

(56) References Cited

U.S. PATENT DOCUMENTS

| 5,933,466 A | 8/1999 | Oshima et al. |
| 6,591,361 B1 | 7/2003 | Liao et al. |
| 2002/0059354 A1* | 5/2002 | Uchida .................. 708/495 |

FOREIGN PATENT DOCUMENTS

| CN | 1355623 A | 6/2002 |
| JP | 11-024887 A | 1/1999 |
| WO | WO 2005/011157 A1 | 2/2005 |

OTHER PUBLICATIONS

3GPP TS 25.346, "3rd Generation Partnership Project; Technical Specification Group Radio Access Network; Introduction of the Multimedia Broadcast Multicast Service (MBMS) in the Radio Access Network (RAN); Stage 2," 2008, pp. 1-60.

* cited by examiner

*Primary Examiner* — Kwang B Yao
*Assistant Examiner* — Adam Duda
(74) *Attorney, Agent, or Firm* — Sughrue Mion, PLLC

(57) ABSTRACT

A method of conducting soft combining of at least two received MBMS signals in a user equipment (112) of a radio telecommunications network (100), the method including: demodulating (202) at least a subset of the received MBMS signals; converting (208-1-208-$m$) a floating point slot data vector to a fixed point slot data vector for each demodulated received MBMS signal; and soft combining (214) the fixed-point slot data vectors derived from at least two of said received MBMS signals.

4 Claims, 4 Drawing Sheets

MBMS SOFT COMBINING

TECHNICAL FIELD

The present invention relates to methods for performing soft combining in a user equipment of a UTRA network that is receiving a multimedia broadcast multicast service (MBMS).

BACKGROUND OF THE INVENTION

Most traditional telecommunications services are essentially point-to-point in nature, that is, such services involve communication between a single originating device and a single receiving device. Examples of such point-to-point services include traditional telephone and many on-demand content delivery services such as data downloading, on-demand data streaming.

In recent times, however it has become apparent that broadcast services, or point-to-multipoint services, are attractive to both service providers and customers. For instance customers may be happy to receive some information, e.g. news bulletins and weather reports via a broadcast service. For network providers, broadcast services offer the ability to more efficiently use network resources to send information to a plurality of users compared to servicing the same number of users using point-to-point services.

One point-to-multipoint service that has been developed is the MBMS which has recently been standardized by the $3^{rd}$ Generation Partnership Project (3GPP) in 3GPP TS 25.346. In release 6 of this and other related standards, the ability for the user equipment to conduct soft combining of a plurality of MBMS signals from neighboring cells is mandated. However no specific method for soft combining is mandated in this standard. The applicant's co-pending Australian complete patent application, filed on the same day as the present application, and entitled "MBMS soft combining scheme" (the contents of which are incorporated herein by reference) offers one method of performing soft combining of MBMS signals.

Accordingly there is a need for additional methods for use in performing soft combining in a user equipment that is receiving a multimedia broadcast multicast service.

DISCLOSURE OF THE INVENTION

In a first aspect there is provided a method of conducting soft combining of at least two MBMS signals in a user equipment of a radio telecommunications network, the method including:

demodulating at least a subset of the received signals, converting a floating-point slot data vector to a fixed-point slot data vector for each MBMS signal; and soft combining the fixed-point slot data vectors derived from at least two of said MBMS signals.

Preferably the step of combining the fixed-point data vectors includes the step of:

(a) combining a first fixed-point MBMS data vector with a second fixed-point MBMS data vector on a slot-by-slot basis, to generate a combined fixed-point MBMS data vector.

In the event that more than two MBMS signals are to be combined the step (a) can be repeated, using the previously generated combined fixed-point MBMS data vector as the first fixed-point MBMS data vector to generate a subsequent combined fixed-point MBMS data vector.

Step (a) preferably includes the steps of:
(1) buffering a first fixed-point MBMS data vector;
(2) buffering a second fixed-point MBMS data vector; and
(3) combining the buffered data vectors to produce a combined fixed-point MBMS data vector.

Optionally the method includes scaling the buffered fixed-point MBMS data vectors prior to combining them. In the case that more than two MBMS data vectors are to be combined the method can include, generating a scaling factor relating to the combined fixed-point MBMS data vector.

In a particularly preferred embodiment the present invention includes, for each data stream to be combined, performing a floating-point to fixed-point conversion of the data stream on a slot-by-slot basis. This can include using a predicted scaling factor to perform the floating-point to fixed-point conversion of the data for each slot. Preferably the predicted scaling factor is generated on the basis of the previously converted slot.

In a second aspect the present invention provides a method of receiving an MBMS service in a user equipment of a radio telecommunications network, the method including soft combining of at least two MBMS signals substantially in accordance with the first aspect of the invention.

In a further aspect the present invention also provides a user equipment configured to soft combine at least two MBMS signals substantially in accordance with the first aspect of the invention.

BRIEF DESCRIPTION OF THE DRAWINGS

Illustrative embodiments of the present invention will now be described by way of non-limiting example only with reference to the accompanying drawings, in which.

BEST MODE FOR EMBODYING THE INVENTION

Figure 1:
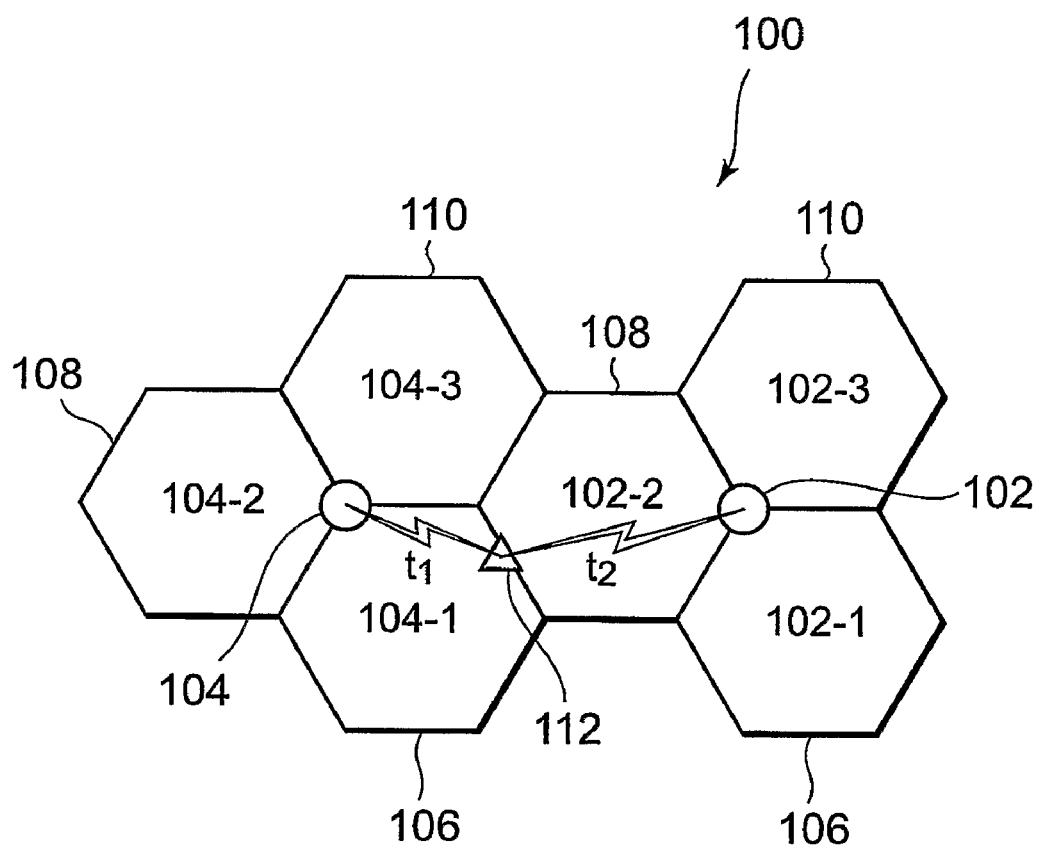
FIG. 1 depicts a user equipment receiving an MBMS service from a plurality of transmission clusters in a UTRA network.

FIG. 1 depicts a portion of a UTRA network 100 which includes two nodes 102 and 104. Each node 102 and 104 include 3 sector transmitters e.g. 102-1, 102-2 and 102-3 belonging to node 102 and 104-1, 104-2 and 104-3 belonging to node 104.

In the present embodiment corresponding sectors of the two nodes 102 and 104 are grouped into transmission clusters. A first cluster 106 includes transmission sectors 102-1 and 104-1, the second transmission cluster 108 includes transmission sectors 102-2 and 104-2 and a third transmission cluster 110 includes transmission sectors 102-3 and 104-3

In transmitting an MBMS service each transmission cluster is allocated a particular time slot for MBMS data transmission. As will be appreciated by those skilled in the art, the time slots assigned to a specific service among the clusters are typically not time-aligned. Accordingly, a user equipment operating in the network 100 will receive the same MBMS transmission from different transmission clusters over one or more time slots with different relative delays.

In the present example, a single user equipment 112 is depicted. The user equipment 112 receives MBMS transmissions from both nodes 102 and 104. In a first time slot $t_1$ the user equipment 112 receives the MBMS transmission from the transmission cluster 106 and in a second time slot $t_2$ the user equipment 112 receives the same MBMS data from the cluster 108. The user equipment 112 may also receive a third transmission of the MBMS data in a time slot $t_3$. However, in the present example, as the user equipment does not fall within the transmission area of a sector of the transmitter belonging to the cluster 110, no third transmission is received.

In order to obtain the reliability benefits associated with receiving multiple versions of the same MBMS data, the user equipment 112 is arranged to combine the signals or select the best of these signals for provision of the MBMS service to the user.

Figure 2:
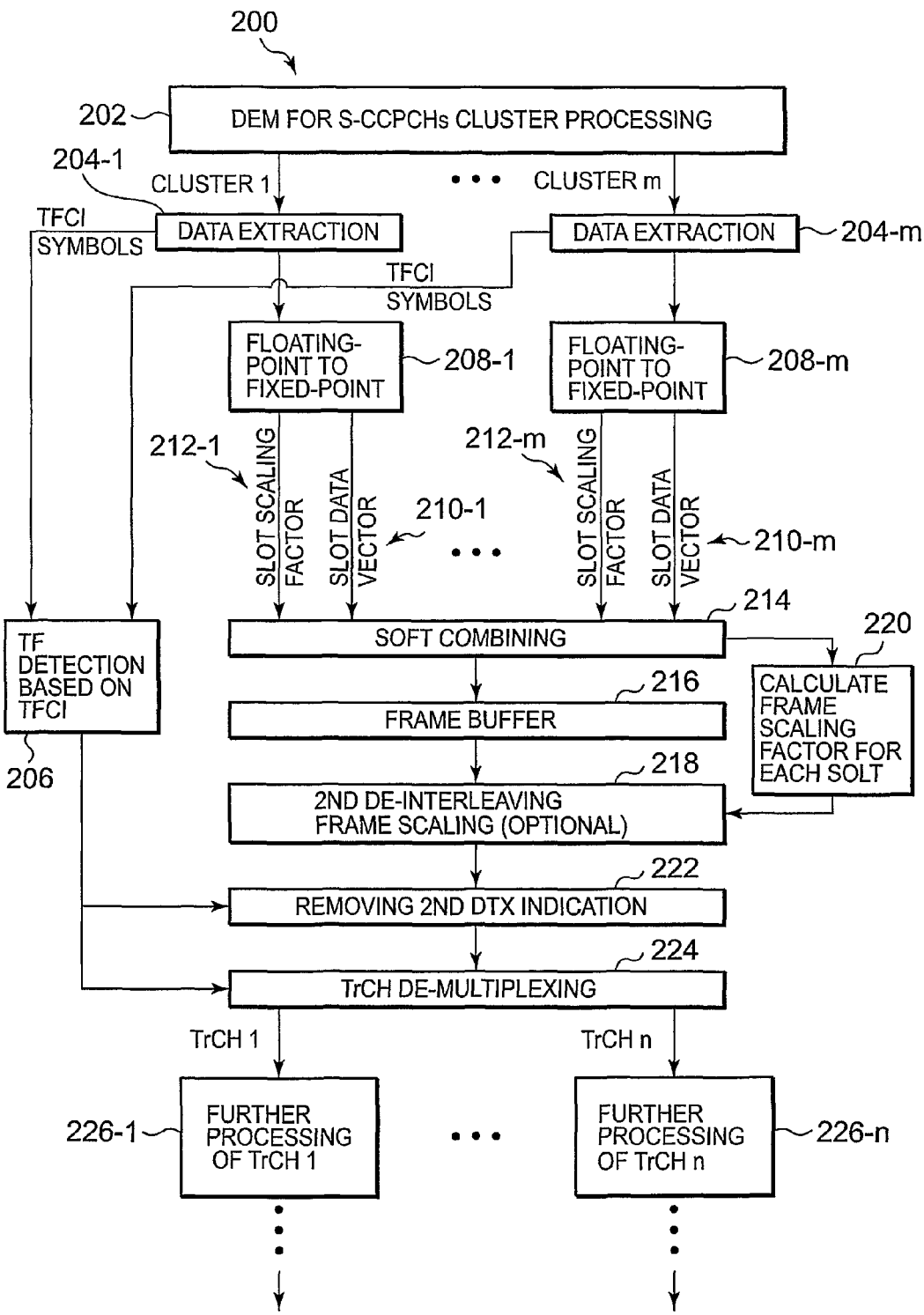
FIG. 2 is a flow chart depicting an overview of a method of soft combining according to an embodiment of the present invention.

FIG. 2 depicts a flow chart in a so called soft combining scheme that can be used by the user equipment 112 to combine two or more streams of MBMS data.

In FIG. 2 the method 200 begins by receiving MBMS signal streams from a plurality of transmission clusters. The method 200 starts with demodulating the received signal in step 202 to extract Secondary Common Control Physical Channel (S-CCPCH) signals corresponding to each cluster. For each cluster, that is cluster 1 to cluster m, transport format information is extracted at steps 204-1 to 204-m. These can be used in step 206 to determine the transport format of the data stream. The transport format can be determined in using the method described in our above referenced co-pending application or using a conventional method.

In steps 208-1 to 208-m, the floating-point raw MBMS data is converted to fixed-point format on a slot by slot basis. For each data stream 1 to m, a slot data vector e.g. 210-1 and a corresponding slot scaling factor e.g. 212-1 are passed to the soft combining stage 214 for combination into a single data stream. The soft combined data is then fed to a frame buffer 216 for second de-interleaving at 218 with optional frame normalization. If frame normalization is performed a frame scaling factor for each slot is determined at step 220 from the slot scaling factors derived in step 214.

The transport format information derived in step 206 is used to determine the transport format of the received data for use in step 222 for removing the second DTX indicators and in step 224 for de-multiplexing the n transport channels from the soft combined MBMS signals. After transport channel de-multiplexing at step 224, each of the transport channels can be further processed in steps 226-1 to 226-n in a conventional manner.

Figure 3:
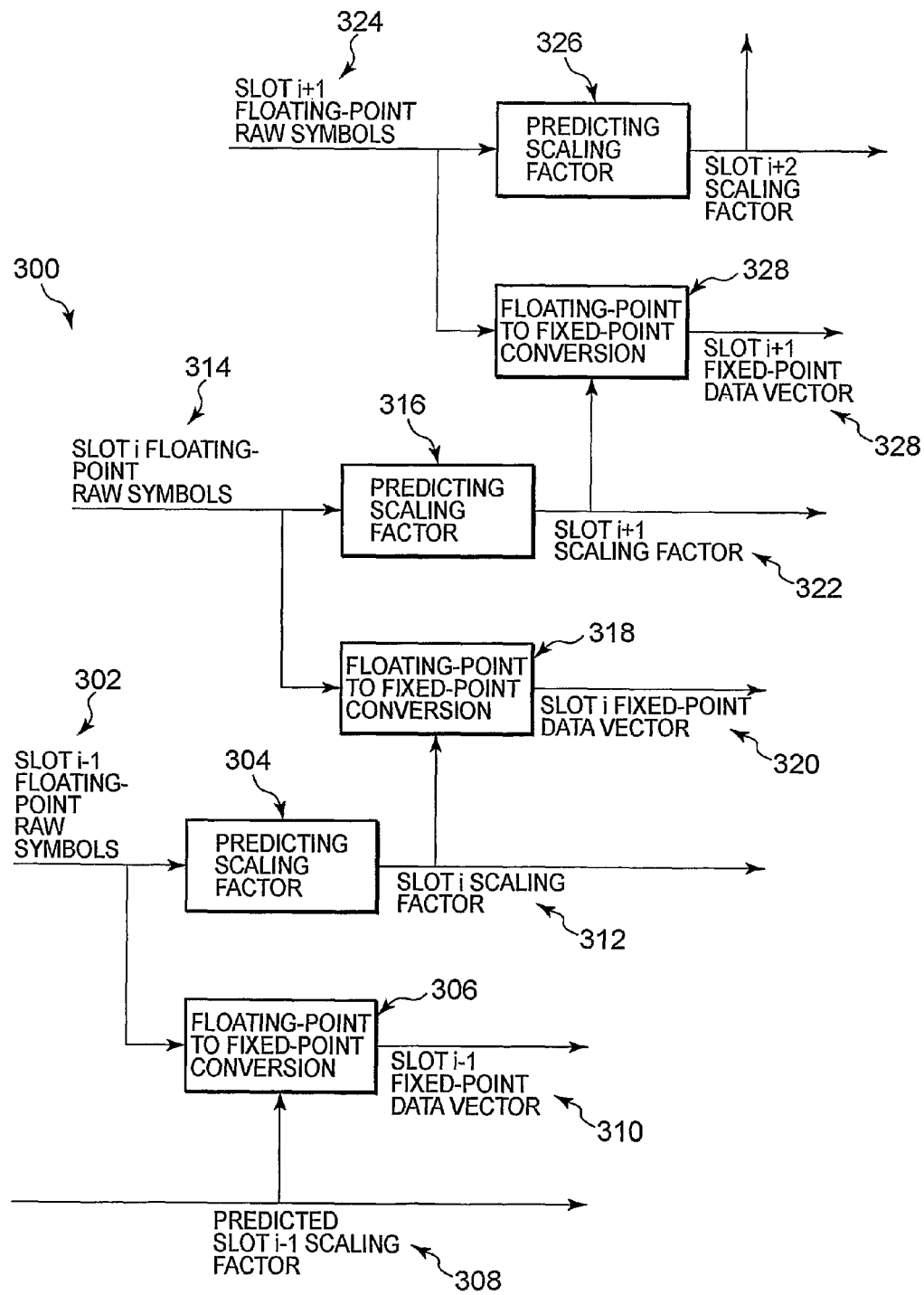
FIG. 3 depicts a method for performing a floating-point to fixed-point conversion used in an embodiment of the present invention.

FIG. 3 depicts a floating-point to fixed-point conversion algorithm used in a preferred embodiment of the present invention. In order to eliminate the delay normally required for slot normalization, in the algorithm described herein the slot scaling factor for the current slot is predicted on the basis of the proceeding slot. This prediction is typically relatively accurate as the channel strength is not expected to change much from one slot to the next. When using the method, the difference in scaling factor from one slot to the next may be compensated by slightly increasing the bit width of the fixed-point word after conversion.

FIG. 3 depicts a process of performing a floating-point to fixed-point conversion for slots i−1 to i+1 of a series of slots. The process 300 starts by the receipt of the raw floating-point symbols for slot i−1 at 302. The raw floating-point symbols for slot i−1 are used to predict a scaling factor for the next slot i.e. slot i, in 304 and are also converted from floating-point to fixed-point format in step 306. The floating-point to fixed-point conversion of step 306 is performed on the basis of a predicted scaling factor 308. The received predicted scaling factor 308 is determined on the basis of the previous slot, namely slot i−2. For slot i−1 the scaling factor 308 and fixed-point data vector 310 are passed on to the soft combining stage (stage 214 of FIG. 2) for combining with data from a corresponding slot of another MBMS data stream.

The scaling factor 312 predicted on the basis of slot i−1 is then used in the floating-point to fixed-point conversion for slot i. The floating-point to fixed-point algorithm for slot i operates in much the same way as for slot i−1. In this regard, the incoming slot i floating-point raw data symbols 314 are used in step 316 for predicting a scaling factor for the next slot, slot i+1. The raw floating-point symbols 314 are converted from floating-point to fixed-point at step 318 using the predicted slot i scaling factor 312 to generate the slot i fixed-point data vector 320. The prediction stage 316 generates the predicted scaling factor for slot i+1 for use in the floating-point to fixed-point conversion of data for slot i+1. This conversion process operates in the same way as for previous slots with the incoming raw floating-point data for i+1 324 being used to generate a predicted scaling factor for the next slot at 326 and the raw symbols being converted from floating-point to fixed-point in step 328 using the predicted scaling factor 322 from slot i.

As will be appreciated the advantage of this daisy chain scheme is that it eliminates a one slot delay and a buffer for one slot worth of floating-point data, which is typically required for slot normalization. Moreover, in this arrangement, the scaling vector factor can simply be implemented as a bit shift applied to the slot data.

As will be appreciated, when a new S-CCPCH data stream is opened the slot scaling factor for the first slot processed cannot be predicted from a previous slot. In this case, a prediction of the appropriate slot scaling factor must be taken from another source, for example, from the strength of the common pilot channel (CPICH) and the power offset between the CPICH and S-CCPCH.

It should be noted that the embodiments of the present invention are not limited to using this method of implementing slot normalization and floating-point to fixed-point conversion. Rather the embodiments of the present invention may use a more conventional scheme for implementing slot normalization and floating-point to fixed-point conversion.

Figure 4:
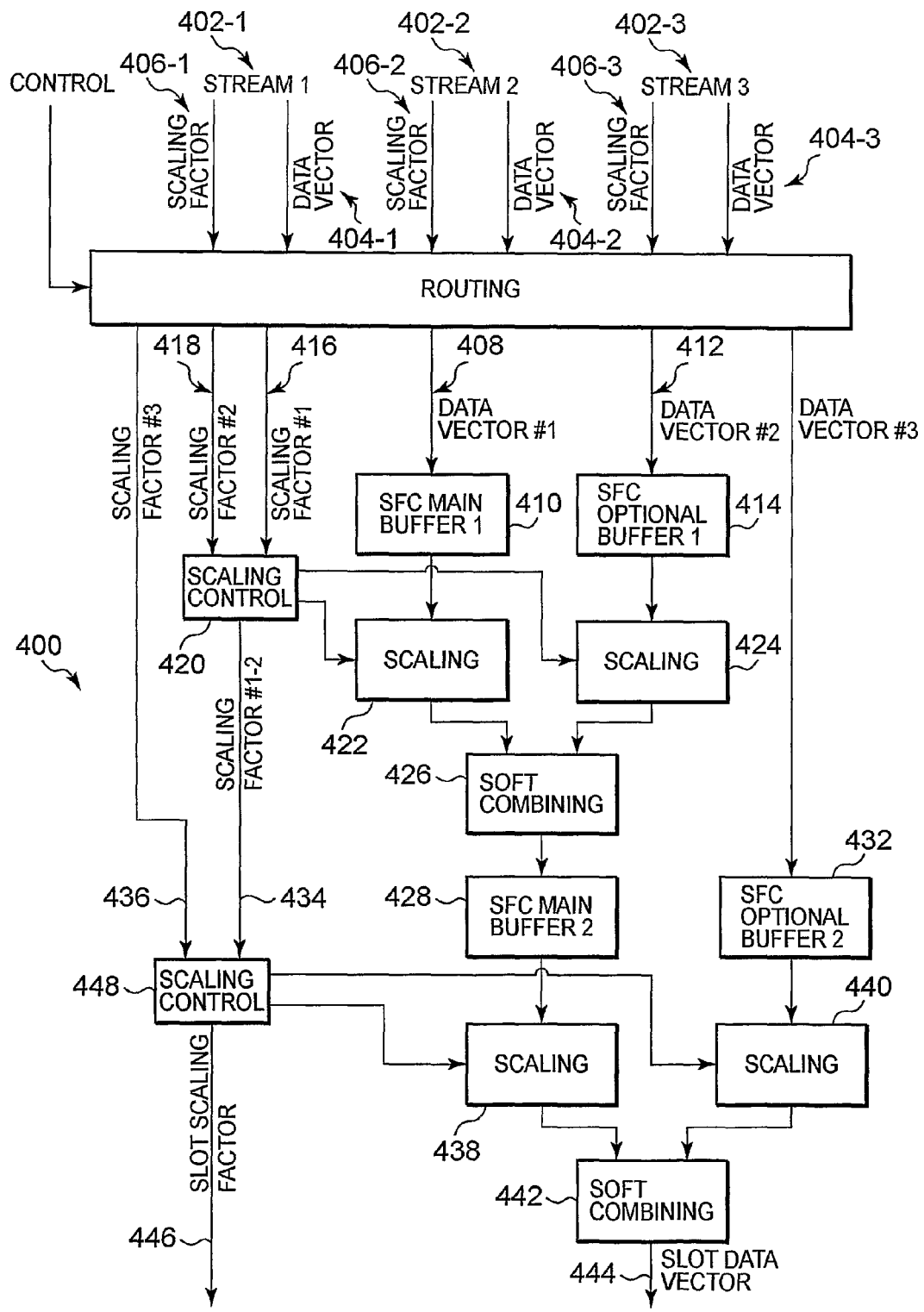
FIG. 4 depicts the details of a method of soft combining two MBMS data streams in accordance with a preferred embodiment of the present invention.

In preferred embodiments of the present invention the soft combining step illustrated as step 214 of FIG. 2 can be performed according to the method described in FIG. 4. FIG. 4 illustrates an example of a method of performing fixed-point soft combining for one slot of the data stream. In this example, three data streams are combined however it should be noted that the method can be generalized for use with any number (2 or more) of data streams.

In the present example three data stream 402-1 to 402-3 are received in the soft combining stage. As described in connection with FIGS. 2 and 3 for each data stream includes a data vector, 404-1, 404-2 and 404-3 and a corresponding scaling factor 406-1, 406-2 and 406-3, respectively. In the preferred embodiment when the number of data streams for soft combining is more than two, it is desirable to buffer the earliest of the data streams and combine the other, later received, data streams with the earliest data stream as soon as they become available.

In the present example, the earliest received data stream is stream 1 (402-1) which is followed by stream 2 (402-2) and the last received data stream is stream 3 (402-3). Accordingly, the method begins by combining data streams 1 and 2 (402-1 and 402-2). This is performed by initially buffering the first received data stream i.e. data vector 408 in the main soft combining buffer 410. The second received data vector 412 is then buffered in the optional buffer 414. The corresponding scaling factors for data vector 408 and 412 (namely 416 and 418 respectively) are passed to the scaling control stage 420. The scaling factors generated at 420 are then applied in steps 422 and 424 respectively to the buffered data sets, before soft combining is performed in steps 426. The result of the first soft combining at 426 is then passed to the second main soft-combining buffer 428 and the process is repeated for each additional data stream to be combined.

The process 400 continues by the buffering of the data vector 430 of the next data stream in the second optional buffer 432. The scaling factors corresponding to the buffered data vectors 428 and 432, namely scaling factors 434 and 436, respectively, are then passed to the scaling control block 448. The scaling factors generated at 448 are then applied in steps 438 and 440, respectively. It should be noted that the scaling factor 434 which corresponds to the soft combined data vector 426 is scaling factor derived from the scaling factors of the previously combined data streams. As before, the scaled data stream 438 and 440 are then combined in step 442 to produce the output slot data vector 444 and an output slot scaling vector 446 is derived from the scaling factors of the previously combined data streams, namely, scaling factors 434 and 436, respectively.

In the present example two main buffers are used to align the "earliest" data stream with the later received data streams. These buffers can be implemented as a single buffer or as two separate buffers with their sizes being split dynamically. The two optional buffers illustrated may not be required in some implementations.

The scaling control blocks 420 and 448 which control the scaling factors applied to the data streams before soft combining can simply apply a bit shift left or right to the fixed-point data vectors as discussed in relation to the slot normalization strategy above.

In an embodiment of the present invention the soft combining steps 426 and 442 can be achieved by either a simple addition to allow bit width growth or by scaling down each data with the number of data streams before soft combining.

Following the soft combining, the slot data vector 444, as indicated in FIG. 2 is then passed to the frame buffer 216 for further processing. A frame's worth of slot scaling factors 446 generated by the scaling control block 448 can be used in step 220 to produce new slot scaling factors used by frame normalization 218 during the second de-interleaving if frame normalization is required.

As will be appreciated by those skilled in the art, a fixed-point soft combining scheme in accordance with the preferred embodiment of the present invention may provide the following advantages:
   minimized processing, e.g. (a) by soft combining data streams at an early stage to avoid the duplicated processing across data streams, and (b) using less expensive fixed-point processing at an early stage as compared to floating-point processing, and
   reduced total buffer size (width×length) when compared to systems that perform floating-point soft combining and/or other fixed-point soft combining in which the soft combining is performed at a later stage.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method of conducting soft combining of at least two received MBMS signals in a user equipment of a radio telecommunications network, the method including:
   demodulating, by a device of the user equipment the at least two received MBMS signals;
   converting floating-point slot data vectors to fixed-point slot data vectors for the at least two demodulated received MBMS signals; and
   soft combining the fixed-point slot data vectors derived from the at least two demodulated received MBMS signals,
   wherein the step of soft combining the fixed-point data vectors includes the step of:
   (a) combining a first fixed-point MBMS data vector with a second fixed-point MBMS data vector on a slot-by-slot basis, to generate combined fixed-point MBMS data vectors,
   wherein step (a) further includes the steps of:
   (1) buffering the first fixed-point MBMS data vector;
   (2) buffering the second fixed-point MBMS data vector; and
   (3) combining the buffered first and second fixed-point MBMS data vectors to produce a combined fixed-point MBMS data vector,
   wherein the method further includes scaling the buffered first and second fixed-point MBMS data vectors prior to combining them,
   wherein in the case that more than two MBMS data vectors are to be combined the method further includes generating a scaling factor relating to the combined fixed-point MBMS data vector,
   wherein the method further includes:
   for each MBMS signal to be soft combined, performing a floating-point to fixed-point conversion of a data stream on a slot-by-slot basis;
   predicting a slot scaling factor for a current slot on a basis of a proceeding slot; and
   using the predicted slot scaling factor to perform the floating-point to fixed-point conversion of the data stream for each slot,
   wherein the predicted slot scaling factor is generated on a basis of a previously converted slot.

2. The method of claim 1, wherein in the event that more than two MBMS signals are to be combined, step (a) is repeated using the previously generated combined fixed-point MBMS data vector as the first fixed-point MBMS data vector to generate a subsequent combined fixed-point MBMS data vector.

3. A method of receiving an MBMS service in a user equipment of a radio telecommunications network, the method including soft combining of at least two MBMS signals in accordance with the method of claim 1.

4. A user equipment configured to soft combine at least two MBMS signals in accordance with the method of claim 1.

* * * * *